United States Patent
Kuroba et al.

(10) Patent No.: US 11,400,996 B2
(45) Date of Patent: Aug. 2, 2022

(54) STRADDLE TYPE VEHICLE

(71) Applicant: HONDA MOTOR CO., LTD., Tokyo (JP)

(72) Inventors: Yoshiyuki Kuroba, Wako (JP); Futoshi Koga, Wako (JP); Hiroshi Maeda, Wako (JP); Naoto Yamashita, Wako (JP); Akihito Kawamura, Wako (JP); Shohei Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 17/093,890

(22) Filed: Nov. 10, 2020

(65) Prior Publication Data
US 2021/0053642 A1    Feb. 25, 2021

Related U.S. Application Data

(63) Continuation of application No. PCT/JP2018/019896, filed on May 23, 2018.

(51) Int. Cl.
| | |
|---|---|
| *B62J 50/16* | (2020.01) |
| *B62J 45/41* | (2020.01) |
| *B62J 17/04* | (2006.01) |
| *B62J 45/42* | (2020.01) |
| *B62J 50/21* | (2020.01) |

(52) U.S. Cl.
CPC ............ *B62J 50/16* (2020.02); *B62J 17/04* (2013.01); *B62J 45/41* (2020.02); *B62J 45/42* (2020.02); *B62J 50/21* (2020.02)

(58) Field of Classification Search
CPC ... B62J 50/16; B62J 45/41; B62J 17/04; B62J 45/42; B62J 50/21
See application file for complete search history.

(56) References Cited

U.S. PATENT DOCUMENTS

| | | |
|---|---|---|
| 10,399,623 B2 | 9/2019 | Yeo |
| 10,583,881 B2 | 3/2020 | Yeo |
| 10,913,503 B2 | 2/2021 | Yeo |
| (Continued) | | |

FOREIGN PATENT DOCUMENTS

| | | |
|---|---|---|
| JP | 2006103600 A | 4/2006 |
| JP | 2013068735 A | 4/2013 |
| (Continued) | | |

OTHER PUBLICATIONS

Office Action for Indian Application No. 202017049676.0 dated Jun. 21, 2021.

(Continued)

*Primary Examiner* — D Glenn Dayoan
*Assistant Examiner* — Melissa Ann Bonifazi
(74) *Attorney, Agent, or Firm* — Thomas | Horstemeyer, LLP

(57) ABSTRACT

A straddle type vehicle comprises: a detection unit for detecting a condition of front of a vehicle; a cleaning member capable of cleaning the detection unit; and a movable apparatus for changing a position of the cleaning member in relation to the detection unit in a height direction of the vehicle, wherein the cleaning member, by the changing of the position, performs the cleaning by wiping with a portion of the detection unit where the cleaning unit contacts the detection unit.

10 Claims, 9 Drawing Sheets

(56) References Cited

U.S. PATENT DOCUMENTS

| | | | |
|---|---|---|---|
| 2008/0245391 A1* | 10/2008 | Wulf | B60S 1/30 |
| | | | 15/250.28 |
| 2017/0240238 A1* | 8/2017 | Di Tanna | B60S 1/3409 |
| 2018/0154965 A1 | 6/2018 | Yeo | |
| 2018/0154966 A1 | 6/2018 | Yeo | |
| 2018/0162471 A1 | 6/2018 | Yeo | |
| 2021/0070389 A1* | 3/2021 | Harada | F21S 43/19 |

FOREIGN PATENT DOCUMENTS

| | | |
|---|---|---|
| JP | 2015123840 A | 7/2015 |
| JP | 2015125367 A | 7/2015 |
| JP | 2016009099 A | 1/2016 |
| KR | 101730879 B1 | 4/2017 |
| WO | 2015198645 A1 | 12/2015 |
| WO | 2019/224958 A1 | 11/2019 |

OTHER PUBLICATIONS

International Search Report and Written Opinion for PCT/JP2018/019896 dated Aug. 14, 2018.

\* cited by examiner

STRADDLE TYPE VEHICLE

CROSS-REFERENCE TO RELATED APPLICATION

This application is a continuation of International Patent Application No. PCT/JP2018/019896 filed on May 23, 2018, the entire disclosures of which are incorporated herein by reference.

BACKGROUND OF THE INVENTION

Field of the Invention

The present invention relates to a straddle type vehicle, specifically, a straddle type vehicle capable of cleaning a detection unit for detecting a condition of the front of the vehicle.

Description of the Related Art

For example, in PTL1, a motorcycle on which a camera is mounted as a detection unit for detecting a condition of the front of a vehicle is disclosed.

CITATION LIST

Patent Literature

PTL1: Japanese Patent Laid-Open No. 2015-123840

SUMMARY OF INVENTION

Technical Problem

In a case where contamination such as dirt adheres to a lens unit which is the front portion of a detection unit, the accuracy of a detection value obtained by the detection unit may suffer. In order to obtain a good detection value, it is necessary to perform cleaning of the detection unit by wiping off the contamination adhered to the detection unit.

The present invention provides a straddle type vehicle capable of performing cleaning by wiping the detection unit.

Solution to Problem

A straddle type vehicle of the present invention of configuration 1 comprises: a detection unit (16A) for detecting a condition in a front direction of a vehicle (1); a cleaning unit (16C) capable of cleaning the detection unit (16A); and a movable unit (257) for changing a position of the cleaning unit (16C) in relation to the detection unit (16A) in a height direction of the vehicle (1), wherein the cleaning unit (16C), by the changing of the position, performs the cleaning by wiping with a portion of the detection unit (16A) where the cleaning unit (16C) contacts the detection unit (16A).

In the straddle type vehicle of configuration 2, the movable unit (257): changes a position of a windscreen (13) of the vehicle (1) to which the cleaning unit (16C) is attached; and changes the position of the cleaning unit (16C) in relation to the detection unit (16A) in accordance with the position of the windscreen (13).

In the straddle type vehicle of configuration 3, the windscreen (13), by the movable unit (257), can move between a first position in a height direction of the vehicle (1) and a second position which is higher compared to the first position, the cleaning unit (16C), in a state where the windscreen (13) is at the first position, moves to a position that is shifted downward from a front of the detection unit (16A), the cleaning unit (16C), in a state where the windscreen (13) is at the second position, moves to a position that is shifted upward from the front of the detection unit (16A), and the cleaning unit (16C), in a state where the windscreen (13) is at a third position between the first position and the second position, moves to a position in front of the detection unit (16A) in a front-and-rear direction of the vehicle (1).

In the straddle type vehicle of configuration 4, the cleaning unit (16C), at the third position between the first position and the second position, contacts a front portion of the detection unit (16A).

In the straddle type vehicle of configuration 5, the cleaning unit (16C), in a movement from the first position to the second position or in a movement from the second position to the first position, wipes a front portion of the detection unit (16A) at the third position.

In the straddle type vehicle of configuration 6, the movable unit (257) comprises: a driving mechanism (282, 283, and 284) for changing the position of the windscreen (13); and an actuator (295) for operating the driving mechanism (282, 283, and 284).

The straddle type vehicle of configuration 7 further comprises: a control unit (ECU, C11, and C12) for controlling the vehicle (1), wherein the control unit (ECU, C11, and C12), after permitting to start a driving source (21) of the vehicle (1), controls the actuator (295) to cause the windscreen (13) to move from the first position to the second position.

The straddle type vehicle of configuration 8 further comprises g: an operation unit (BT) which is capable of operating the position of the windscreen, wherein the control unit (ECU, C11, and C12), based on an input signal from the operation unit (BT), controls the actuator (295) to cause the windscreen (13) to move.

In the straddle type vehicle of configuration 9, the cleaning unit (16C), in relation to a front view of the vehicle (1), is placed in at least a portion of a back surface of the windscreen (13).

In the straddle type vehicle according to configuration 10, the cleaning unit (16C) is placed on a lower end portion (13a) of the windscreen (13).

In the straddle type vehicle of configuration 11, the detection unit (16A) is a camera having an image capturing element (160), and an attachment member (161) that is placed in front of the image capturing element (160), the attachment member (161) having a protective member that protects a front of the image capturing element (160) or an optical member including a lens unit, and the cleaning unit (16C) performs cleaning by wiping the attachment member.

Advantageous Effects of Invention

By virtue of the straddle type vehicle according to configuration 1, it is possible to provide a straddle type vehicle that is capable of performing cleaning of a detection unit by wiping by a cleaning unit. By this, it becomes possible for the detection unit to obtain a better detection value.

By virtue of the straddle type vehicle according to any one of configurations 2 to 4, it is possible to wipe with a portion of the detection unit where the cleaning unit contacts the detection unit by changing a position of the cleaning unit in relation to the detection unit in accordance with a position of a windscreen. By this, it becomes possible to clean a front portion of the detection unit and for the detection unit to obtain a better detection value.

Also, by virtue of the straddle type vehicle according to configuration 4, it is possible to prevent contamination such as dust from adhering to the front portion of the detection unit. For example, it is possible to prevent contamination such as dust from adhering to the front portion of the detection unit by controlling to set to the third position the initial position of the windscreen during parking and the like of the straddle type vehicle.

By virtue of the straddle type vehicle according to configuration 5, it becomes possible to clean a front portion of the detection unit and for the detection unit to obtain a better detection value. Also, it is possible for the detection unit to capture an image of what is in front of the vehicle by a space being opened in front of the detection unit by the cleaning unit moving from a first position to a second position. Also, it is possible to remove contamination adhered to the front portion of the detection unit during travelling of the vehicle by the cleaning unit moving from the second position to the first position.

By virtue of the straddle type vehicle according to any one of configurations 6 to 8, it is possible to control the position of the windscreen by controlling a movable unit. The cleaning unit wipes with a portion that contacts the detection unit when the position of the cleaning unit is changed based on the control of the position of the windscreen. By this, it becomes possible to clean a front portion of the detection unit and for the detection unit to obtain a better detection value.

By virtue of the straddle type vehicle according to configuration 9 or 10, it is possible to provide a straddle type vehicle that is capable of performing cleaning, by the cleaning unit, of the detection unit that is placed behind a front cover 12.

By virtue of the straddle type vehicle according to configuration 11, it is possible to provide a straddle type vehicle that is capable of, by wiping by the cleaning unit, performing cleaning of an attachment member that has a protective member or an optical member of an image capturing element and is mounted to the front portion of the detection unit. By this, it becomes possible to clean a front portion of the detection unit and for the detection unit to obtain a better detection value.

Further features of the present invention will become apparent from the following description of exemplary embodiments (with reference to the attached drawings).

DESCRIPTION OF THE EMBODIMENTS

An embodiment of the present invention will be described below with reference to the figures. The constituent elements described in the embodiment are merely examples and are not limited by the following embodiment. In each drawing, arrows X, Y, and Z indicate directions perpendicular to each other. The X direction indicates the front-and-rear direction of a motorcycle (a straddle type vehicle), the Y direction indicates the vehicle width direction (left-and-right direction) of the straddle type vehicle, and the Z direction indicates the vertical direction. The left and right of the straddle type vehicle are the left and right in the forward direction. Hereinafter, the front or rear in the front-and-rear direction of the straddle type vehicle will simply be called the front or rear in some cases. Also, inward or outward in the vehicle width direction (left-and-right direction) of the straddle type vehicle will simply be called the inside or outside in some cases.

Overview of the Straddle Type Vehicle

Figure 1:
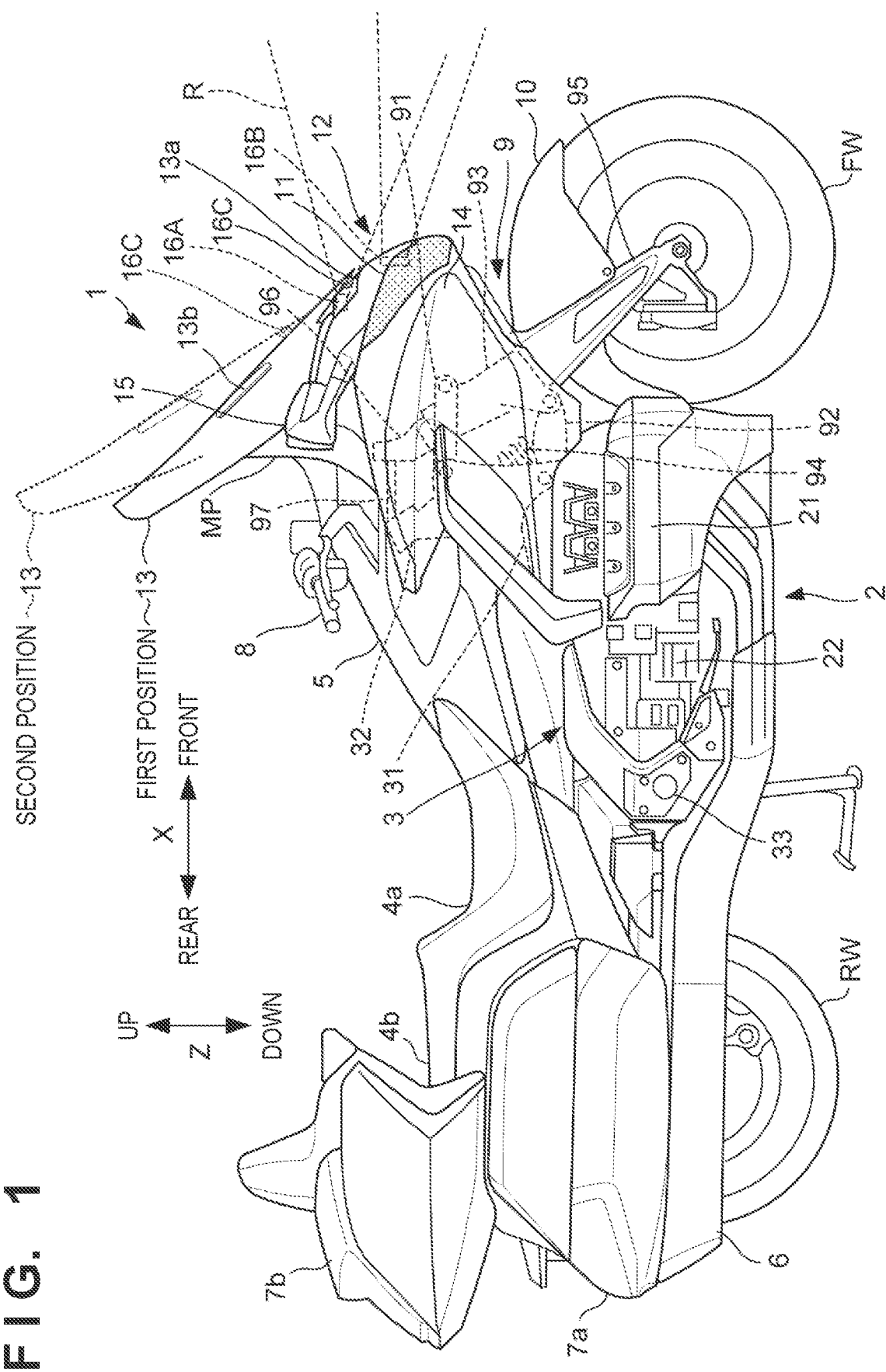
FIG. 1 is a side view of a right side of a straddle type vehicle according to one embodiment.
Figure 2:
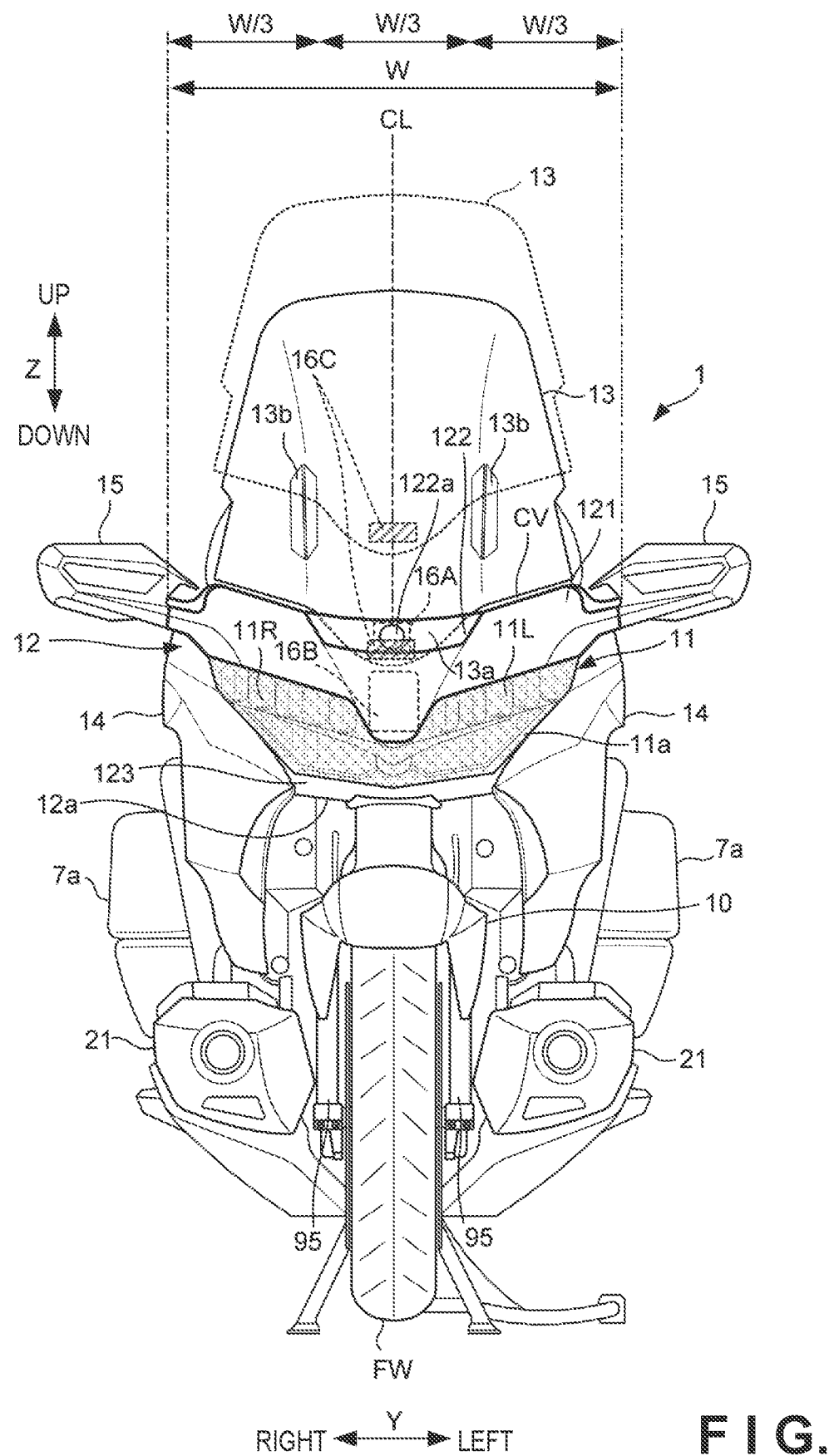
FIG. 2 is a front view of the straddle type vehicle shown in FIG. 1.

FIG. 1 is a right side view of a straddle type vehicle 1 according to one embodiment of the present invention. FIG. 2 is a front view of the straddle type vehicle 1. The straddle type vehicle 1 is a tourer-type motorcycle, which is suitable for a long-distance travel, but it should be noted that the present invention is also applicable to various straddle type vehicles including the other types of motorcycles, and is also applicable not only to vehicles whose driving sources are an internal combustion engine, but also to electric vehicles whose driving source is a motor. In the following description, the straddle type vehicle 1 will sometimes be called a vehicle 1.

The vehicle 1 includes a power unit 2 between a front wheel FW and a rear wheel RW. The power unit 2 in the present embodiment includes a horizontally opposed-six cylinder engine 21 and a transmission 22. A driving force of the transmission 22 is transmitted to the rear wheel RW via a drive shaft (not shown), thereby rotating the rear wheel RW.

The power unit 2 is supported by a vehicle body frame 3. The vehicle body frame 3 includes a pair of left and right main frames 31 extended in the X direction. A fuel tank 5 and an air cleaner box (not shown) are placed above the main frames 31. A meter panel that displays various types of information to the driver (rider) is arranged on the front of the fuel tank 5. An operation unit BT for the rider to perform a movement operation (a rise or drop operation) of a windscreen 13 is placed on a handle switch unit HS (FIG. 7) in the vicinity of the left handle. The position of the windscreen 13 can be operated by an input signal from the operation unit BT.

A head pipe 32 that pivotably supports a steering shaft (not shown) pivoted by a handle 8 is arranged on the front end portion of the main frames 31. A pair of left and right pivot plates 33 are attached to the rear end portions of the main frames 31. The lower end portion of the pivot plates 33 and the leading edge portion of the main frames 31 are connected by a pair of left and right lower arms (not shown). The power unit 2 is supported by the main frames 31 and the lower arms. A pair of left and right seat rails extending in the rear direction are arranged on the rear end portion of the main frames 31. A seat 4a that the rider sits on or a seat 4b that a passenger sits on, a rear trunk 7b, and the like are supported by the seat rail.

A leading edge portion of a rear swing arm (not shown) extending in the front-and-rear direction are swingably supported by the pivot plates 33. The rear swing arm is capable of swinging in an up-and-down direction, and a rear end portion of the rear swing arm is supported by the rear wheel RW. An exhaust muffler 6 for muting the exhaust of the engine 21 extends in the X direction in the lower side portion of the rear wheel RW. Left and right saddlebags 7a are arranged on the upper sides of the rear wheel RW.

The front suspension mechanism 9 for swingably supporting a front wheel FW is configured on the leading edge portion of the main frames 31. The front suspension mechanism 9 includes an upper link 91, a lower link 92, a fork support member 93, a cushion unit 94, and a pair of left and right front forks 95. In the front suspension mechanism 9, the upper link 91, the lower link 92, the fork support member 93, and the cushion unit 94 configure a support mechanism that supports the front forks 95 of the vehicle 1.

The upper link 91 and the lower link 92 are vertically placed on the leading edge portion of each main frame 31. Each rear end portion of the upper link 91 and the lower link 92 are swingably connected to the leading edge portion of the main frames 31. The upper link 91 and the lower link 92 are swingably connected to the fork support member 93. The cushion unit 94 has a structure in which a shock absorber is inserted through a coil spring and the upper end of which is swingably supported by the main frames 31. The lower end portion of the cushion unit 94 is swingably supported by the lower link 92.

The fork support member 93 has a tubular shape and tilts backwards. A steering shaft 96 is rotatably supported around the fork support member 93. The steering shaft 96 has a shaft portion (not shown) inserted into the fork support member 93. A bridge (not shown) is arranged on the lower end portion of the steering shaft 96, and supports the pair of left and right front forks 95. The front wheel FW is rotatably supported by the front forks 95. The upper end portion of the steering shaft 96 is connected to the steerable shaft (not shown) that is pivoted by the handle 8, via a link 97. When the handle 8 is steered, the steering shaft 96 rotates and steers the front wheel FW. The upper portion of the front wheel FW is covered with a fender 10, and the fender 10 is supported by the front forks 95.

Front Portion Structure

Figure 3:
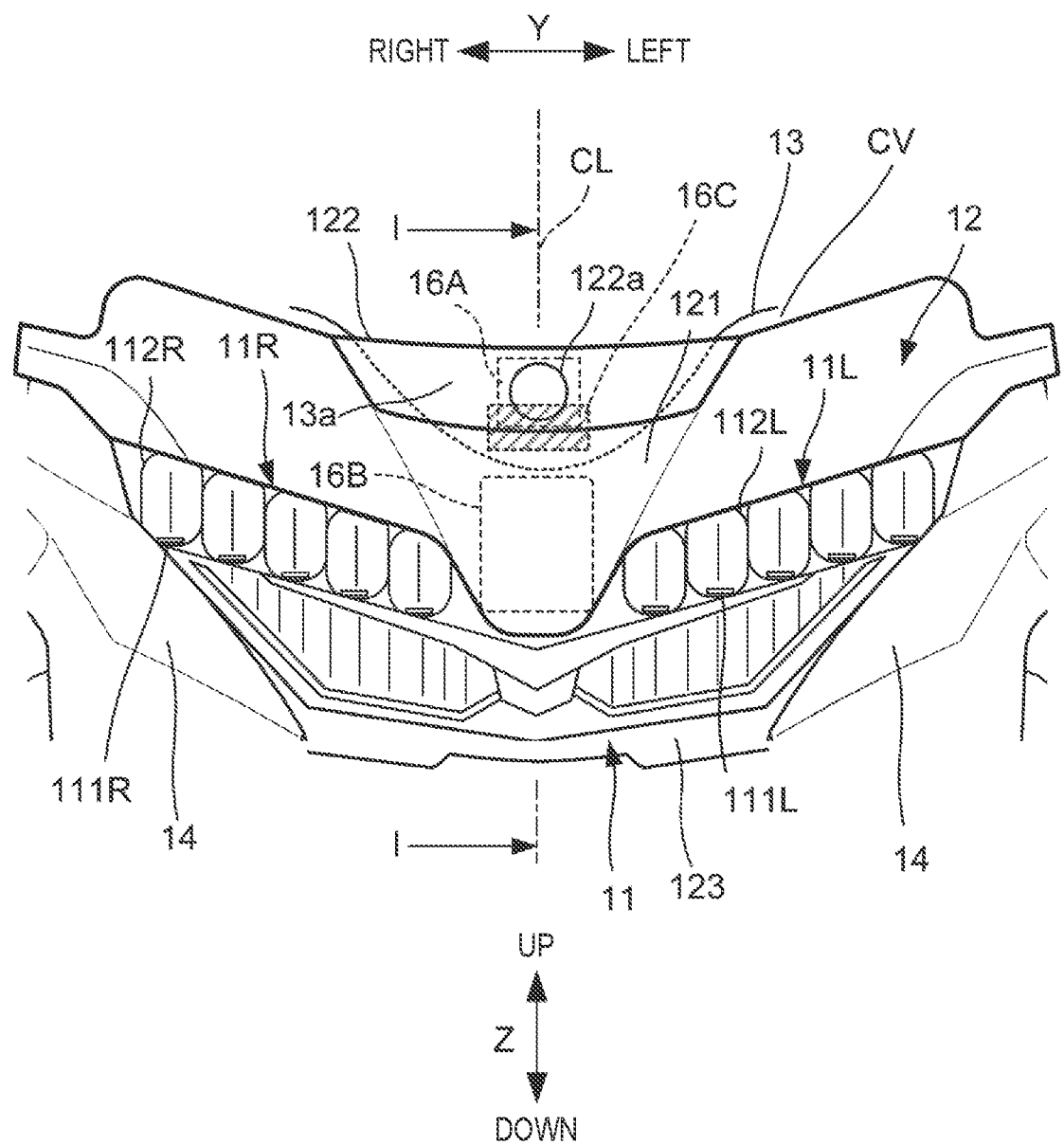
FIG. 3 is a magnification view of the periphery of a headlight unit.
Figure 4A:
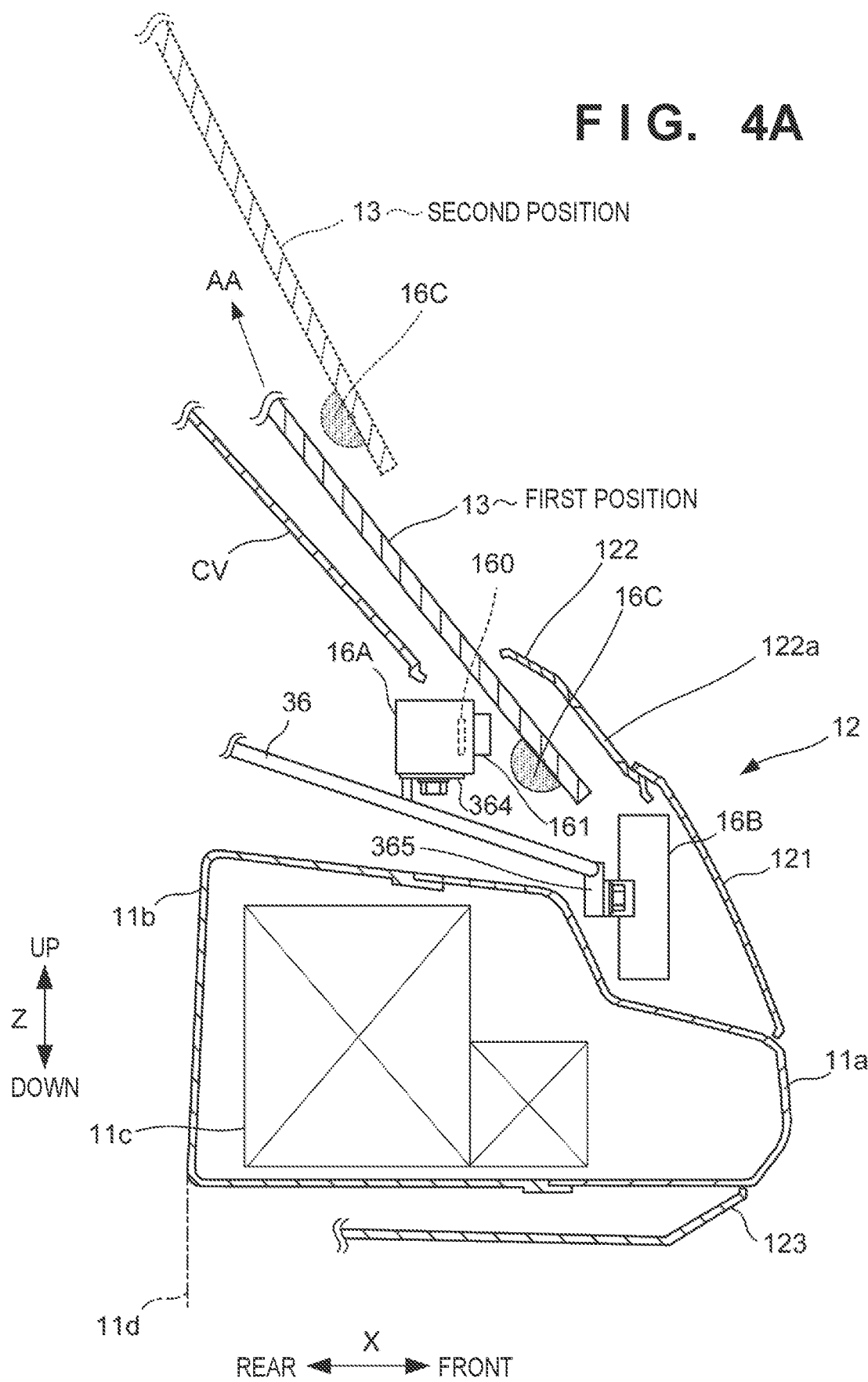
FIG. 4A is an overview cross-sectional view of a front portion structure of the straddle type vehicle.
Figure 4B:
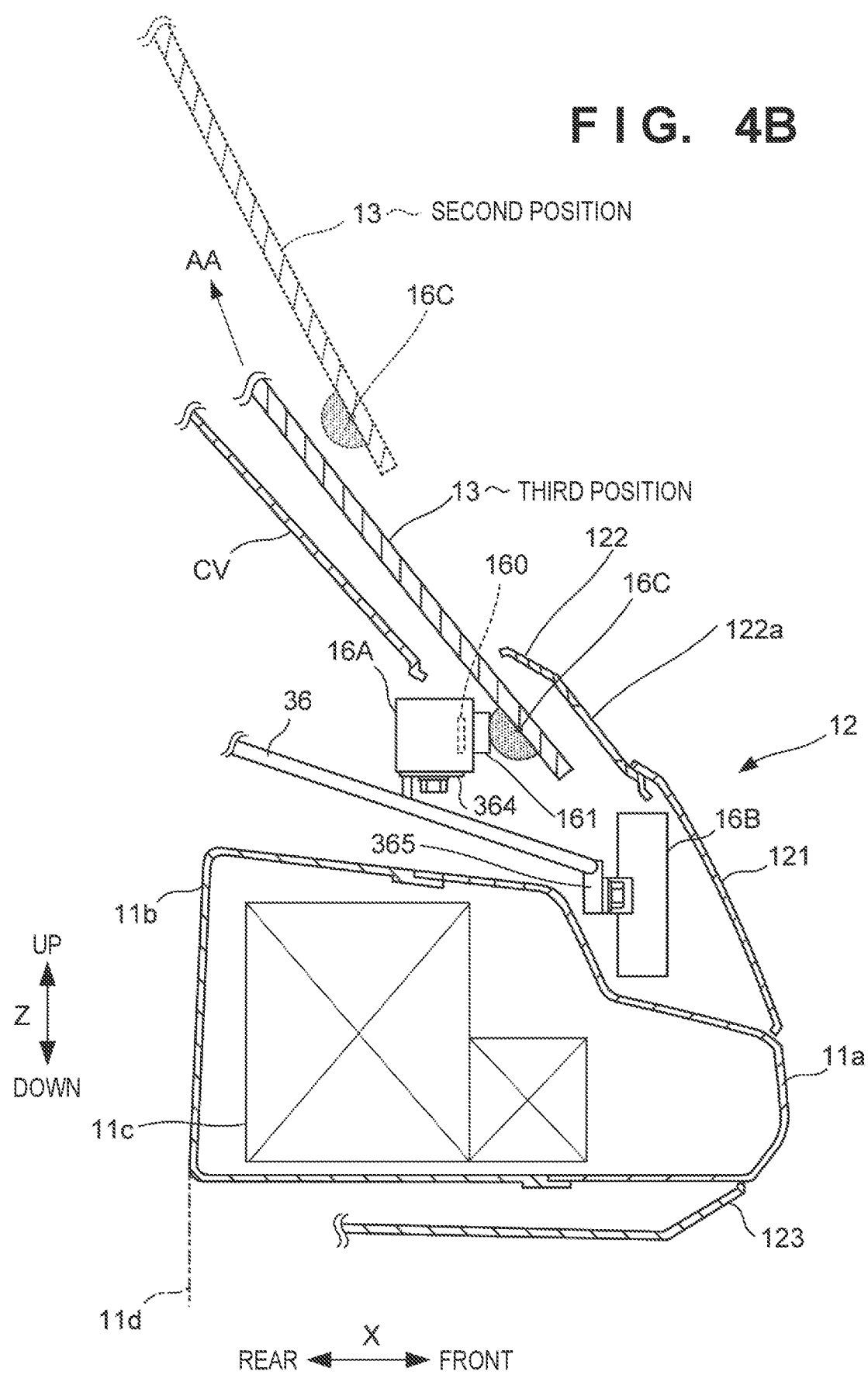
FIG. 4B is an overview cross-sectional view of the front portion structure of the straddle type vehicle.

Description regarding the front portion structure of the vehicle 1 is given with reference to FIG. 1 to FIG. 4A and FIG. 4B. FIG. 3 is a magnification view of the periphery of a headlight unit 11 of the vehicle 1. FIG. 4A and FIG. 4B are overview cross-sectional views of the front portion structure of the vehicle 1 along the I-I line (center line CL) of FIG. 3. The headlight unit 11 for radiating light in a front direction of the vehicle 1 is placed in the front portion of the vehicle 1. The headlight unit 11 in the present embodiment is a twin-lens type headlight unit including a right-side light emitting portion 11R and a left-side light emitting portion 11L positioned with left-right symmetry.

A plurality of pairs (five pairs in the illustrated example) of light sources 111R and reflectors 112R are arranged in the light emitting portion 11R. The light source 111R is a light emitting element such as an LED. The reflector 112R is arranged to surround the light source 111R on the rear side of the light source 111R, and reflects light emitted by the light source 111R in of the vehicle 1 towards the front.

The light emitting portion 11L has the same arrangement as that of the light emitting portion 11R, and includes a plurality of pairs (five pairs in the illustrated example) of the light sources 111L and the reflectors 112L. The light source 111L is a light emitting element such as an LED. The reflector 112L is arranged to surround the light source 111L on the rear side the light source 111L, and reflects light emitted by the light source 111L in the front direction of the vehicle 1. A metal-plating processing is applied to the surfaces of the reflector 112R and the reflector 112L in order to increase the reflectance of light. Light of the light source 111R and the light source 111L is reflected by the front face of the reflector 112R and the reflector 112L and is radiated in the front direction of the vehicle 1.

A lens portion 11a is placed on the front surface of the headlight unit 11. The lens portion 11a is formed by a transparent resin or the like. The lens portion 11a of the present embodiment is a member arranged so as to cover both of the light emitting portion 11R and the light emitting portion 11L. The exterior of the headlight unit 11 is formed by the lens portion 11a and a housing 11b and an electrical circuit 11d schematically shown in FIG. 4A and FIG. 4B is placed in the interior space thereof. The electrical circuit 11d includes the above-described reflectors 112R and 112L and the light sources 111R and 111L, a driving circuit, and the like.

The front portion of the vehicle 1 is covered with the front cover 12, and the front side portions of the vehicle 1 are covered with a pair of left and right side covers 14.

On sides with respect to the front cover 12, a pair of right and left side mirror units 15 is placed, respectively. The side mirror units 15 supports a side mirror (not shown) for use by the rider to see and check in the rear direction.

The front cover 12 includes cowl members 121 to 123 and the cowl members 121 to 123 form a front cowl. The cowl member 121 extends in the Y direction and forms the main body of the front cover 12. The cowl member 122 forms the upper portion the cowl member 121. The cowl member 123 forms the lower portion of the cowl member 121 and is spaced apart downward from the cowl member 121.

Between the cowl member 121 and the cowl member 123 and between the pair of right and left side covers 14, an opening which causes the headlight unit 11 to be exposed is formed. The upper edge of this opening is defined by the cowl member 121 and, the bottom edge of this opening is defined by the cowl member 123, and the left and right side edges of this opening are defined by the side covers 14.

Windscreen 13

The windscreen 13 is placed above the front cover 12 and on the outer side of the cover CV which covers the meter panel MP. The windscreen 13 is a windshield for reducing the wind pressure that the rider experiences during traveling, and is formed by, for example, a transparent resin member. The windscreen 13 has a shape that is curved so as to be positioned downward toward the outside in the vehicle width direction and is curved so as to be positioned upward toward the rear side in the side view.

The lower end portion 13a of the windscreen 13 is formed so as to be convex downward. The lower end edge of the lower end portion 13a is formed so as to have a gentle curvature so as to be convex downward in the front view of the vehicle 1. For the front view of the vehicle 1, a cleaning member 16C capable of cleaning the detection unit (an imaging unit 16A, for example) which is described later is detachably placed on at least a portion of the back surface of the windscreen 13. Also, the cleaning member 16C is placed on the lower end portion 13a of the windscreen 13 in the height direction (the Z direction) of the vehicle 1. The windscreen 13 is movable between a first position (lower position) and a second position (higher position) which is higher compared to the first position in the height direction of the vehicle 1 by an operation of a movable apparatus 257 which is described later.

In FIG. 4A, the windscreen 13 illustrated by the solid line is shown in a state where it is at the first position (lower position). The windscreen 13 illustrated by the dashed line is shown in a state where it is at the second position (higher position). The direction of the arrow AA indicates the movement direction of the windscreen 13.

Also, in FIG. 4B, the windscreen 13 illustrated by the solid line shown is a state where it is at a third position which is between the first position (lower position) and the second position (higher position). The cleaning member 16C mounted on the back surface of the windscreen 13 is configured so as to contact with the front portion of the imaging unit 16A at a third position between the first position and the second position.

Although the cleaning member 16C is illustrated in a state where it contacts the attachment member 161 at the third position in a case where the windscreen 13 moves up to the second position from the first position in FIG. 4B, the cleaning member 16C contacts with the front portion of the imaging unit 16A at the third position similarly to a case where the windscreen 13 moves down to the first position from the second position. By movement of the windscreen 13, the cleaning member 16C can clean the detection unit (the imaging unit 16A) by wiping with a portion of the detection unit 16A where the cleaning unit 16C contacts the detection unit.

Movable Apparatus 257

Figure 5:
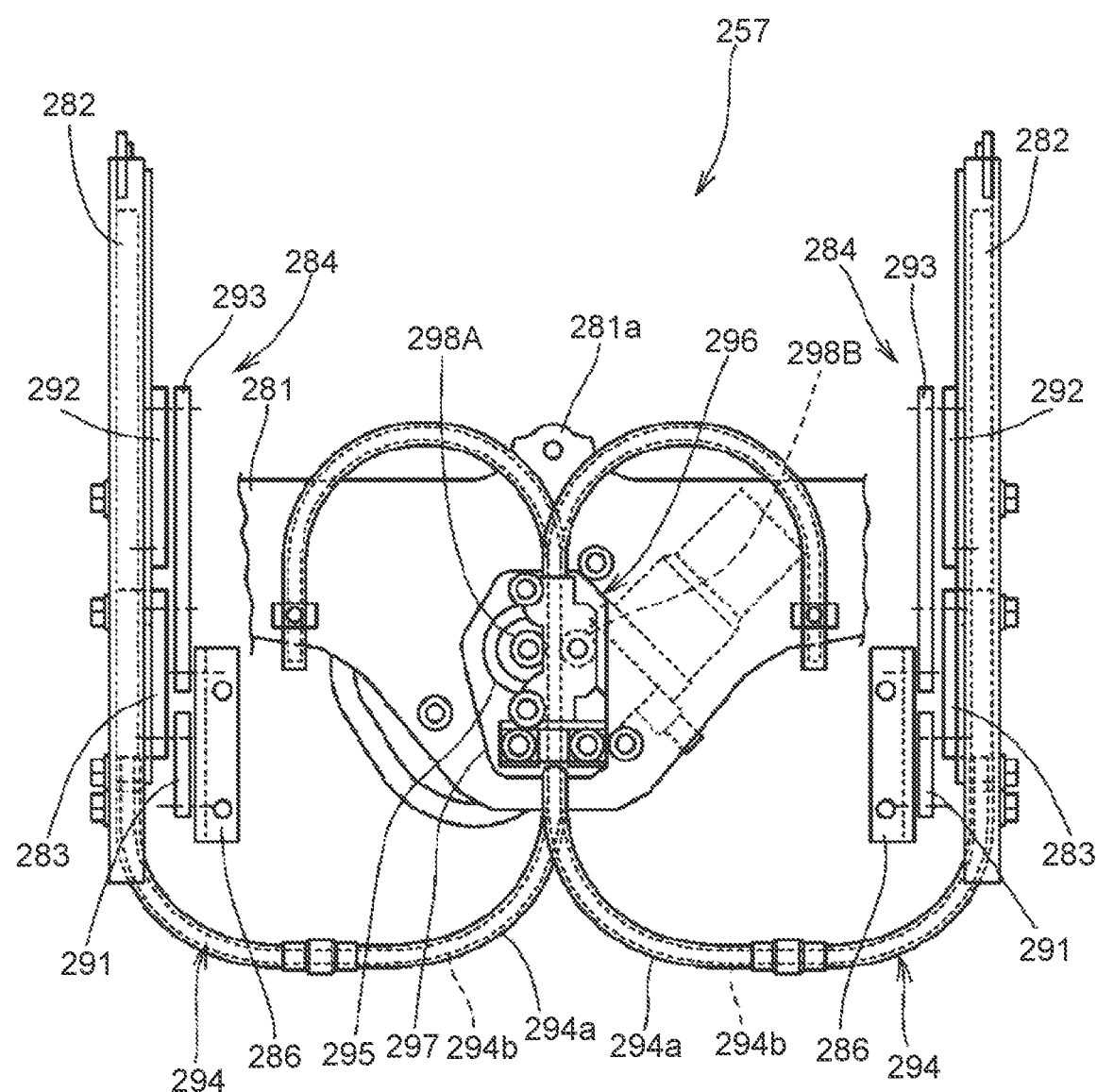
FIG. 5 is a view illustrating a configuration of a movable apparatus that moves a windscreen.

The windscreen 13 is configured so that a vertical position can be changed in the height direction (Z direction) of the vehicle 1 by the movable apparatus 257. FIG. 5 is a view illustrating a configuration of the movable apparatus 257 which moves the windscreen 13. The movable apparatus 257, in the height direction of the vehicle 1, changes the position (vertical position) of the windscreen 13 of the vehicle 1 and changes the position of the cleaning member 16C in relation to the detection unit (the imaging unit 16A) in accordance with the position of the windscreen 13. The cleaning member 16C does the cleaning by wiping with a portion contacting the detection unit (the imaging unit 16A) by the changing of the position. In the present embodiment, the movable apparatus 257 has a driving mechanism (such as reference numerals 282, 283, and 284 of FIG. 5, FIG. 6A, and FIG. 6B) which changes the position of the windscreen 13 and an electric motor 295 (actuator) which causes the driving mechanism to operate.

A support member 281 is attached to the inside of the front cover 12 by a screw or the like via a plurality of attaching portions 281a. Each guide rail 282 parallelly supports the left and right end portions of the support member 281.

A slide portion 283 movably supports the inner side surface of the guide rail 282. The end of a push cable 294 is connected to the lower end portion of the slide portion 283. The push cable 294 is curved from the end toward the center in the vehicle width direction, is curved further upward, and penetrates a cable driving mechanism 296 arranged in the center of the support member 281 in the vehicle width direction, while the other end is fixed to the left and right side portions of the cable driving mechanism 296 in the support member 281 by being curved further outwards in the vehicle width direction.

The cable driving mechanism 296 is equipped with a case 297 which is fixed to the support member 281 and through the interior of which the push cable 294 passes, a pair of rollers 298A and 298B rotatably supported by the case 297, and the electric motor 295 (actuator) attached to the support member 281 or the case 297 in order to cause one roller 298A to be driven. The roller 298A is attached to a pivot shaft of the electric motor 295.

In detail, the push cable 294 is configured by an outer cable 294a and an inner wire 294b movably inserted within the outer cable 294a. One end of the outer cable 294a is fixed to the guide rail 282 and the other end is fixed to the support member 281. One end of the inner wire 294b is connected to the slide portion 283, an intermediate portion is sandwiched between the pair of rollers 298A and 298B, and the other end is a free end within the outer cable 294a. The push cable 294 and the cable driving mechanism 296 described above are configure a portion of the movable apparatus 257.

If the roller 298A rotates by the electric motor 295 operating due to control of control processing unit C11 (FIG. 7) of the control unit ECU, the inner wire 294b sandwiched between the pair of rollers 298A and 298B is pushed out and both the inner wire 294b and the slide portion 283 move upward. Also, when the roller 298A is rotated in the reverse by the electric motor 295 based on the control of the control processing unit C11, the inner wire 294b is pulled back and the slide portion 283 moves downward.

Figure 6A:
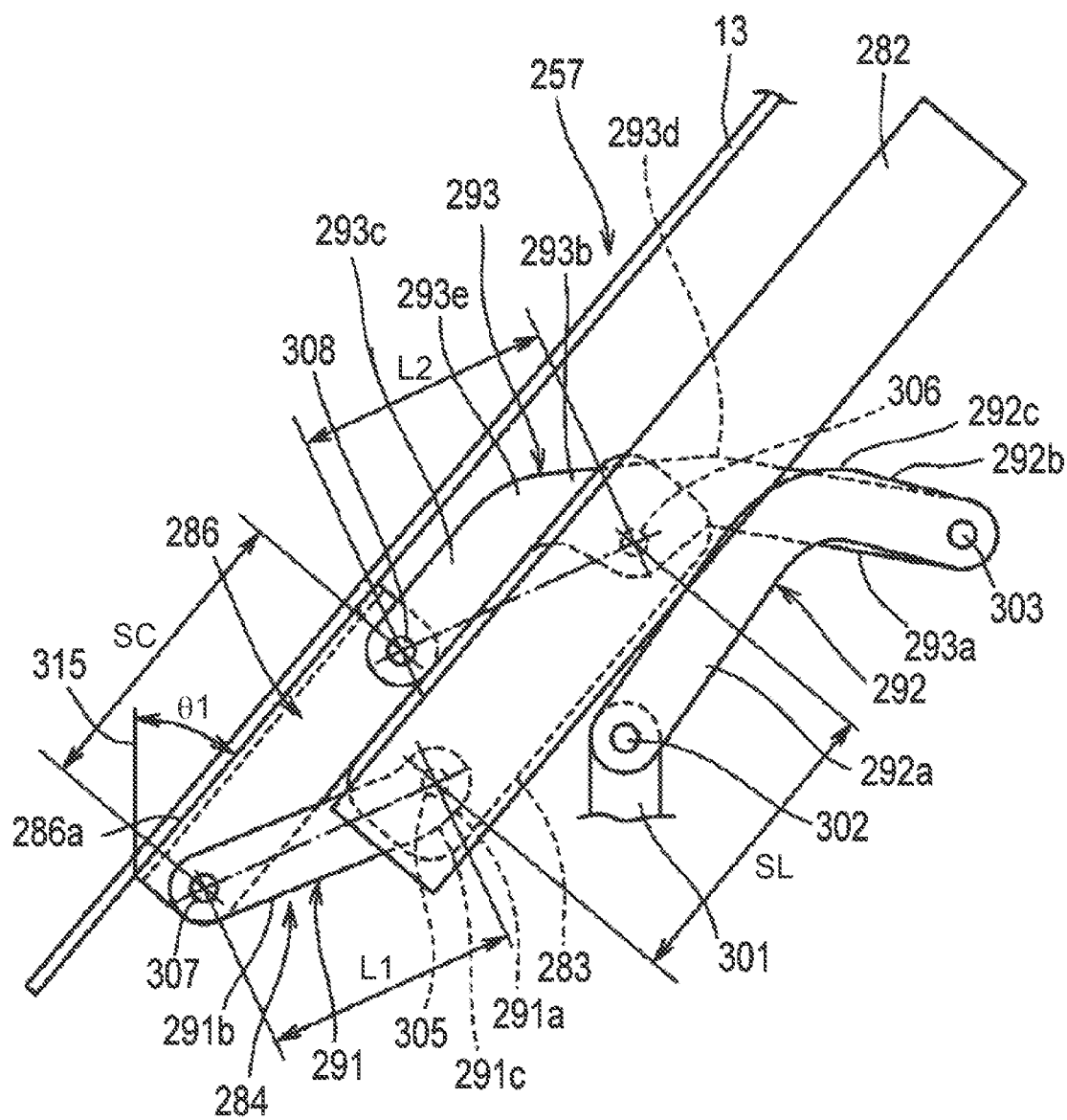
FIG. 6A is a left side view illustrating a main component of the movable apparatus.

FIG. 6A is a left side view illustrating a main component of the movable apparatus 257. The slide portion 283 in a state in which it is placed at the lower end portion of the guide rail 282, and the windscreen 13 is in the lowest position (state A in FIG. 1).

The movable apparatus 257 has a linking mechanism 284, and the linking mechanism 284 is configured by a first link 291, a second link 292, and a third link 293. A link support portion 301 is arranged on the support member 281 (with reference to FIG. 5) and one end portion of the second link 292 is swingably supported by the link support portion 301 via a supporting shaft 302. One end portion of the third link 293 is swingably connected to the other end portion of the second link 292 via a supporting shaft 303.

A slide-side lower supporting shaft 305 is arranged at the lower end portion of the slide portion 283 and a slide-side upper supporting shaft 306 is arranged at the upper end of the slide portion 283. One end portion of the first link 291 is swingably supported by the slide-side lower supporting shaft 305 and the intermediate portion of the third link 293 is swingably supported by the slide-side upper supporting shaft 306.

A screen-side lower supporting shaft 307 is arranged at the lower end portion of a screen support portion 286 and a screen-side upper supporting shaft 308 is arranged at the upper end of the screen support portion 286. The other end portion of the first link 291 is swingably supported by the screen-side lower supporting shaft 307 and the other end portion of the third link 293 is swingably supported by the screen-side upper supporting shaft 308.

The first link 291 is integrally equipped with an end portion 291a, a straight portion 291b, and a curved portion 291c which curves such that it is convex downward connecting each of the end portion 291a and the straight portion 291b and is tilted forward and downward as a whole.

The second link 292 is integrally equipped with two straight portions 292a and 292b and a curved portion 292c which curves such that it is convex upward connecting these straight portions 292a and 292b.

The third link 293 is integrally equipped with three straight portions 293a, 293b, and 293c, a curved portion 293d which curves such that it is convex upward connecting between the straight portions 293a and 293b, and a curved portion 293e which curves such that it is convex upward connecting between the straight portions 293b and 293c, and the straight portion 293b is supported by the slide-side upper supporting shaft 306 and the third link 293 extends roughly horizontally as a whole.

The distance between the slide-side lower supporting shaft 305 and the screen-side lower supporting shaft 307 is L1 and the distance between the slide-side upper supporting shaft 306 and the screen-side upper supporting shaft 308 is L2. Also, the distance between the slide-side lower supporting shaft 305 and the slide-side upper supporting shaft 306 is SL and the distance between the screen-side lower supporting shaft 307 and the screen-side upper supporting shaft 308 is SC. The relationship of the distance L1 and the distance L2 and the relationship of the distance SL and the distance SC can be arbitrarily set in the movable apparatus 257, and based on the setting of these distances, it is possible to set an angle of inclination when the windscreen 13 moves. An angle θ1 is an angle of inclination of a vertical line 315 from a front surface 286a of the screen support portion 286, in other words, is an angle of inclination when the windscreen 13 is placed at the lowest position.

Figure 6B:
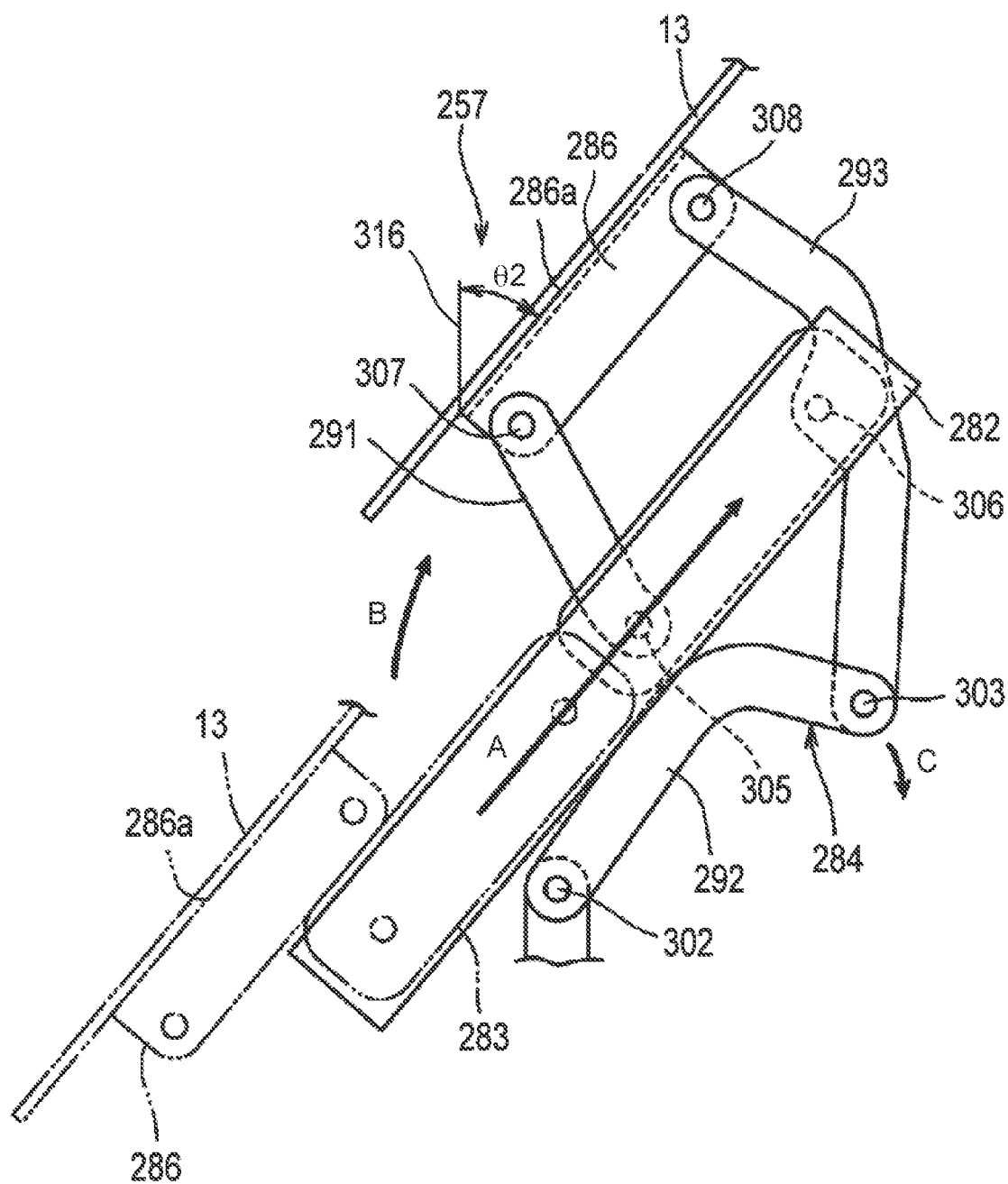
FIG. 6B is a view illustrating an operation example of the movable apparatus.

Operation of the movable apparatus 257 is described next. FIG. 6B is a view illustrating an operation example of the movable apparatus 257 and illustrates a state (the state B of FIG. 1) where the windscreen 13 is caused to be raised to a highest position. By the control processing unit C11 (FIG. 7) controlling the electric motor 295 (actuator), the position of the windscreen 13 can be adjusted steplessly from the lowest position shown in FIG. 6A to the highest position shown in FIG. 6B while gradually changing its inclination angle (θ1).

In FIG. 6B, an angle θ2 is an angle of inclination of the windscreen 13 at the highest position. For example, for the link mechanism of the movable apparatus 257, in a case where the distance SL and the distance SC are set to be equidistant (SL=SC) and the distance L2 is set to be longer compared to the distance L1 (L1<L2), the angle of inclination of the windscreen 13 is the angle θ1>the angle θ2. The angle of inclination (θ2) at the highest position with respect to the vertical line 316 is smaller compared to the angle of inclination (θ1) at the lowest position.

It is possible to set relationship of the distance L1 and the distance L2 and the relationship of the distance SL and the distance SC such that the angle of inclination becomes greatest in a case where the windscreen 13 is placed at the lowest position and such that the angle of inclination becomes lowest when the windscreen 13 is placed at the highest position. By setting such angles of inclination, it becomes possible to achieve a greater windshield effect.

In FIG. 6B, the windscreen 13, the slide portion 283, and the screen support portion 286 at the positions illustrated in FIG. 6A are illustrated by the two dot broken lines. The slide portion 283 rises from a lower end side to an upper end side of the guide rail 282 along the guide rail 282 as illustrated by the arrow A. In conjunction with this, the windscreen 13 and the screen support portion 286 rise in a roughly arc-shaped trajectory from a position near the lower end of the guide rail 282 to a position distant in the front direction from the upper end of the guide rail 282 as illustrated by the arrow B.

Because the second link 292 swings centered around the supporting shaft 302 due to the third link 293 connected to the slide portion 283 swinging centered around the slide-side upper supporting shaft 306 in accordance with the rising of the slide portion 283, the supporting shaft 303 which is a coupling portion between the second link 292 and the third link 293 swings in the direction of the arrow C.

The windscreen 13 has an attaching portion 13b. The windscreen 13 is attached to the screen support portion 286 due to the attaching portion 13b being attached to the screen support portion 286. The movement direction and movement amount of the slide portion 283 is controlled by the control processing unit C11 controlling the rotation direction and the rotation angle of the electric motor 295 (actuator). The windscreen 13 moves to change the vertical position based on the movement of the slide portion 283.

Cleaning Operation by the Cleaning Member 16C

The imaging unit 16A and a radar 16B are placed behind the front cover 12 as a detection unit for detecting the condition in a front direction of the vehicle 1. In the case of the present embodiment, the imaging unit 16A and the radar 16B are both supported by the main frames 31 via a stay 36. A plate-shaped attaching portion 364 to which the imaging unit 16A is fixed by a bolt fastener is arranged at the center of the stay 36 and an attaching portion 365 to which the radar 16B is fixed by a bolt fastener is arranged at the front of the stay 36. Because the main frames 31 are members whose rigidity is high even among the vehicle body frame 3, by making the main frames 31 to be of a structure that supports the imaging unit 16A and the radar 16B, it becomes possible to improve their support rigidity and prevent the detection range from shifting due to the use of the vehicle 1.

The imaging unit 16A and the radar 16B are placed on a central portion in the Y direction of the front cover 12 in the front view of the vehicle. As an example of such an arrangement, FIG. 2 shows an arrangement in which when a width W of the front cover 12 in the Y direction is equally divided into three portions, and the imaging unit 16A and the radar 16B are arranged such that their centers in the Y direction are positioned within the range of W/3 in the center. It is possible to set the attachment position of the cleaning member 16C in relation to the windscreen 13 in accordance with the arrangement position of the imaging unit 16A in the Y direction.

The movable apparatus 257 described in FIGS. 5, 6A, and 6B changes the vertical position of the windscreen 13 to which the cleaning member 16C is attached and then changes the position of the cleaning member 16C in relation to the detection unit (imaging unit 16A) in accordance with the position of the windscreen 13. The windscreen 13 is movable between a first position (lower position) and a second position (higher position) which is higher compared to the first position in the height direction of the vehicle 1 by an operation of the movable apparatus 257, for example.

In FIGS. 1, 2, and 4A, the windscreen 13 illustrated by the solid line indicates the windscreen 13 that is at the first position (lower position), and the windscreen 13 that is illustrated by the dashed line indicates the windscreen 13 that is at the second position (higher position).

As shown in FIG. 4A, in a state where the windscreen 13 is at the first position, the cleaning member 16C moves to a position that is shifted downward from the front of the detection unit (imaging unit 16A), and the cleaning member 16C moves to a position that is spaced in relation to the detection unit. Then, as shown in FIG. 4B, in a state where the windscreen 13 is at the third position, the cleaning member 16C moves to a position that is in front of the detection unit (imaging unit 16A) in the front-and-rear direction of the vehicle 1. Also, in a state where the windscreen 13 is at the second position, the cleaning member 16C moves to a position that is shifted upward from the front of the detection unit (imaging unit 16A). For example, the cleaning member 16C moves to a position that is spaced upward in relation to the imaging unit 16A. Note that it is also possible to arrange in the back surface of the windscreen 13 a movement mechanism for moving the cleaning member 16C in accordance with the movement of the windscreen 13 and shift in the vertical direction or the left-and-right direction in relation to the position of the front of the detection unit the position of the cleaning member 16C.

In a case where the windscreen 13 moves from the first position to the second position or from the second position to the first position, the cleaning member 16C contacts and wipes the front portion of the detection unit (imaging unit 16A) in the third position between the first position and the second position. By this, it becomes possible to clean the front portion of the detection unit (imaging unit 16A).

For example, the windscreen 13 that is at the second position during travelling of the vehicle 1 moves to the first position during parking of the vehicle 1. When the cleaning member 16C attached to the windscreen 13 moves, the cleaning member 16C contacts and wipes the front portion of the detection unit (imaging unit 16A). By this, it becomes possible to clean the front portion of the detection unit (the imaging unit 16A). During travelling of the vehicle 1, it becomes possible to remove the contamination adhered to the front portion of the imaging unit 16A.

The imaging unit 16A has an image capturing element 160 such as a CCD image sensor and a CMOS image sensor, and the attachment member 161 placed in front of the image capturing element 160. The attachment member 161, for example, has a protective member for protecting the front of the image capturing element 160, an optical member including the lens unit, and the like, and the imaging unit 16A is configured as a camera that has the attachment member 161 (for example, protective member and optical member). The cleaning member 16C performs cleaning by wiping the attachment member 161. In other words, the cleaning member 16C performs cleaning by wiping the protective member or the optical member.

An opening 122a is formed on and penetrates the cowl member 122, and the imaging unit 16A is placed so that its optical axis passes through the opening 122a of the cowl member 122 and then is directed to the front of the vehicle 1. The imaging unit 16A captures an image in the front direction of the vehicle 1 through the opening 122a.

Also, as the detection unit, the radar 16B is a millimeter-wave radar, for example. In a case where an obstacle in front of the vehicle 1 or another vehicle approaching the vehicle 1 is detected by the imaging unit 16A and the radar 16B, a display of notification for prompting a warning to the rider can be performed on a meter panel, for example.

In the present embodiment, when the cleaning member 16C is moved with the windscreen 13 by the movable apparatus 257, the cleaning member 16C wipes the surface of the attachment member 161 by contacting the attachment member 161 placed in front of the imaging unit 16A. By this, the surface of the attachment member 161 (for example, protective member and optical member (lens unit)) of the imaging unit 16A can be cleaned.

The control unit ECU (electric control unit (FIG. 7)) for controlling the straddle type vehicle 1 can control to the first position or the third position the initial position of the windscreen 13 during parking. For example, in a state where the windscreen 13 is at the third position as the initial position, the cleaning member 16C is positioned at the front of the detection unit (imaging unit 16A) (FIG. 4B). In other words, the cleaning member 16C is placed between the imaging unit 16A and the opening 122a in a state of contact with the front portion of the detection unit (imaging unit 16A). In this state, the front portion of the imaging unit 16A is covered in a state of contact with the cleaning member 16C.

If control is performed so as to set to the third position the initial position of the windscreen 13 during parking and the like of the vehicle 1, it becomes possible to prevent contamination such as dust from adhering to the front portion (attachment member 161) of the detection unit (imaging unit 16A).

Also, when the windscreen 13 moves from the first position to the second position, cleaning is performed by the cleaning member 16C at the third position between the first position and the second position. Then, when the windscreen 13 moves to the second position, the cleaning member 16C moves to a position that is shifted upward from the front of the detection unit (imaging unit 16A). By the cleaning member 16C moving, the space between the imaging unit 16A and the opening 122a is opened, and the imaging unit 16A can capture in the front direction of the vehicle 1 from the opening 122a.

The cleaning member 16C wipes the front portion of the detection unit (imaging unit 16A) at the third position between the first position and the second position in the movement from the first position to the second position or in the movement from the second position to the first position. By this, it becomes possible to clean the front portion of the detection unit (imaging unit 16A), and the imaging unit 16A can obtain a better detection value.

Also, by setting the initial position of the windscreen 13 at the third position and by the cleaning member 16C covering the front portion of the detection unit (imaging unit 16A) in a state of contacting the front portion thereof so as to prevent contamination from adhering, the imaging unit 16A can obtain a better detection value.

Control Unit ECU

Figure 7:
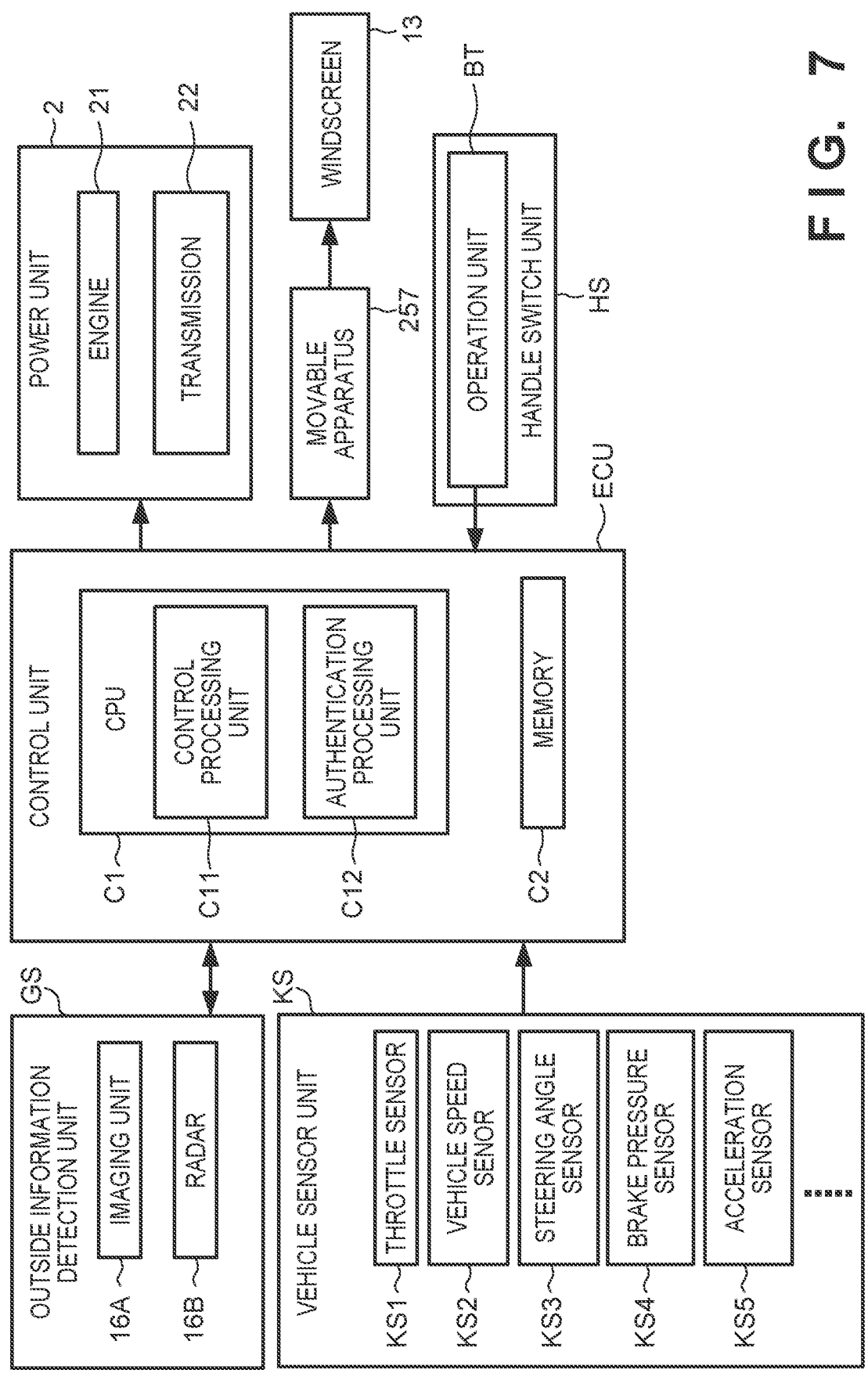
FIG. 7 is a view illustrating a functional configuration of a control unit that controls the straddle type vehicle.

FIG. 7 is a view illustrating a functional configuration of the control unit ECU (electric control unit) that controls the straddle type vehicle 1 in the present embodiment.

The imaging unit 16A and the radar 16B are included in an outside information detection unit GS for obtaining external information of the surrounding of the straddle type vehicle 1. The detection information of the imaging unit 16A and the radar 16B are inputted into the control unit ECU.

For example, a throttle sensor KS1, a vehicle speed senor KS2, a steering angle sensor KS3, a brake pressure sensor KS4, an acceleration sensor KS5, and the like are included in a vehicle sensor unit KS for obtaining the vehicle information of the straddle type vehicle 1, and the detection information from each sensor is inputted into the control unit ECU.

The control unit ECU functions as the control processing unit C11 for executing processing related to control and the authentication processing unit C12 for executing authentication processing by executing the control program stored in a memory C2.

The control processing unit C11 of the control unit ECU performs the control of the power unit 2 (engine 21 and transmission 22) based on the detection information of the outside information detection unit GS and the vehicle sensor unit KS.

The authentication processing unit C12 of the control unit ECU performs authentication processing of the driver by an electronic key or the like and permits the start of the driving source of the vehicle 1 (engine 21) based on the result of authentication.

The operation unit BT for the rider to perform the movement operation of the windscreen 13 is placed on the meter panel MP, and when an input signal from the operation unit BT is inputted to the control unit ECU, the control processing unit C11 of the control unit ECU can control the electric motor 295 (actuator) based on the input signal from the operation unit BT in order to move the windscreen 13.

The control processing unit C11 of the control unit ECU controls the electric motor 295 (actuator) of the movable apparatus 257 based on the input signal from the operation unit BT in order to move the windscreen 13 from the first position to the second position. For example, in a case where the initial position of the windscreen 13 is at the third position, the control unit ECU controls the electric motor 295 (actuator) based on the input signal from the operation unit BT after permitting the start of the driving source 21 in order to move to from the first position to the second position after moving the windscreen 13 from the third position to the first position.

Other Embodiments

Although in the embodiment described above, the imaging unit 16A and the radar 16B were exemplified as the detection unit for detecting the condition in the front direction of the vehicle 1, only the imaging unit 16A may be arranged without arranging the radar 16B.

Also, another detection unit such as an ultrasonic sensor may be arranged in place of the radar 16B or in addition to the radar 16B. Also, although in the embodiment described above, one imaging unit 16A was arranged, a plurality of the imaging units 16A may be arranged. In such a case, the cleaning member 16C may be attached to the windscreen 13 corresponding to each of the plurality of the imaging units 16A.

Also, although in the embodiment described above, the imaging unit 16A are exemplified as the detection unit that can be cleaned by the cleaning member 16C, a configuration may be taken so as to switch the positions of the imaging unit 16A and the radar 16B and so that the cleaning member 16C wipes the front portion of the radar 16B. By this, it becomes possible to clean the front portion of the detection unit (imaging unit 16A).

The present invention is not limited to the above embodiments and various changes and modifications can be made within the spirit and scope of the present invention. Therefore, to apprise the public of the scope of the present invention, the following claims are made.

What is claimed is:

1. A straddle type vehicle comprising:
a detection unit for detecting a condition in a front direction of a vehicle;
a cleaning unit capable of cleaning the detection unit; and
a movable unit for changing a position of the cleaning unit in relation to the detection unit in a height direction of the vehicle, wherein
the cleaning unit, by the changing of the position, performs the cleaning by wiping with a portion of the detection unit where the cleaning unit contacts the detection unit, and
the movable unit:
changes a position of a windscreen of the vehicle to which the cleaning unit is attached; and
changes the position of the cleaning unit in relation to the detection unit in accordance with the position of the windscreen.

2. The straddle type vehicle according to claim 1, wherein
the windscreen, by the movable unit, can move between a first position in a height direction of the vehicle and a second position which is higher compared to the first position,
the cleaning unit, in a state where the windscreen is at the first position, moves to a position that is shifted downward from a front of the detection unit,
the cleaning unit, in a state where the windscreen is at the second position, moves to a position that is shifted upward from the front of the detection unit, and
the cleaning unit, in a state where the windscreen is at a third position between the first position and the second position, moves to a position in front of the detection unit in a front-and-rear direction of the vehicle.

3. The straddle type vehicle according to claim 2, wherein the cleaning unit, at the third position between the first position and the second position, contacts a front portion of the detection unit.

4. The straddle type vehicle according to claim 2, wherein the cleaning unit, in a movement from the first position to the second position or in a movement from the second position to the first position, wipes a front portion of the detection unit at the third position.

5. The straddle type vehicle according to claim 2, wherein the movable unit comprises:
a driving mechanism for changing the position of the windscreen; and
an actuator for operating the driving mechanism.

6. The straddle type vehicle according to claim 5, further comprising:
a control unit for controlling the vehicle, wherein
the control unit,
after permitting to start a driving source of the vehicle,
controls the actuator to cause the windscreen to move from the first position to the second position.

7. The straddle type vehicle according to claim 6, further comprising:
an operation unit which is capable of operating the position of the windscreen, wherein
the control unit, based on an input signal from the operation unit, controls the actuator to cause the windscreen to move.

8. The straddle type vehicle according to claims 1, wherein the cleaning unit, in relation to a front view of the vehicle, is placed in at least a portion of a back surface of the windscreen.

9. The straddle type vehicle according to claim 8, wherein the cleaning unit is placed on a lower end portion of the windscreen.

10. The straddle type vehicle according to claim 1, wherein
 the detection unit is a camera having an image capturing element, and an attachment member that is placed in front of the image capturing element,
 the attachment member having a protective member that protects a front of the image capturing element or an optical member including a lens unit, and
 the cleaning unit performs cleaning by wiping the attachment member.

* * * * *